US008220667B1

(12) United States Patent
Butcher et al.

(10) Patent No.: US 8,220,667 B1

(45) Date of Patent: Jul. 17, 2012

(54) DISPENSING UNIT FOR DISPENSING FLUID MATERIAL PREPACKAGED IN A CONTAINER

(76) Inventors: Angelia Butcher, Chadds Ford, PA (US); Todd Koch, Harleysville, PA (US); Shelby Kettle, Chadds Ford, PA (US); Donna Bradley-Koch, Harleysville, PA (US); Patricia McCaffery, West Chester, PA (US)

( * ) Notice: Subject to any disclaimer, the term of this patent is extended or adjusted under 35 U.S.C. 154(b) by 686 days.

(21) Appl. No.: 12/416,091

(22) Filed: Mar. 31, 2009

(51) Int. Cl.

| | |
|---|---|
| ***A45D 24/22*** | (2006.01) |
| ***G01F 11/00*** | (2006.01) |
| ***B65D 88/54*** | (2006.01) |
| ***B05B 11/00*** | (2006.01) |

(52) U.S. Cl. .................... 222/196; 222/321.1; 222/372; 222/226

(58) Field of Classification Search .................. 222/196, 222/192, 226, 185.1, 464.7, 464.1, 377, 321.1, 222/321.5, 321.6, 321.7, 321.8, 321.9, 383.1, 222/383.3, 372, 385; 422/501, 521, 522; 73/864.01-864.25; 248/311.3, 313, 316.1
See application file for complete search history.

(56) References Cited

U.S. PATENT DOCUMENTS

| | | | | |
|---|---|---|---|---|
| 774,888 | A * | 11/1904 | Murphy | 222/325 |
| 1,986,248 | A * | 1/1935 | Bowlzer | 222/321.5 |
| 1,986,250 | A * | 1/1935 | Cole | 222/321.5 |
| 3,966,095 | A | 6/1976 | Chappell | |
| 6,601,736 | B2 | 8/2003 | Ophardt et al. | |

* cited by examiner

*Primary Examiner* — Kevin P Shaver
*Assistant Examiner* — Stephanie E Williams
(74) *Attorney, Agent, or Firm* — LaMorte & Associates, P.C.

(57) ABSTRACT

A dispenser system for dispensing a highly viscous liquid from a container having a threaded neck. The system utilizes a base that is positioned under the container. The base defines a receptacle that receives the threaded neck of the container. In this manner, gravity biases the contents of the container into the base. A pump is provided that draws some of the highly viscous liquid from the base. The pump is held atop a support. The support holds the pump at a predetermined height above the base. The height of the pump is greater than the length of the container. In this manner, the pump is unobstructed in a full range around the pump. The pump can therefore be accessed from any angle without interference by the inverted container.

10 Claims, 3 Drawing Sheets

DISPENSING UNIT FOR DISPENSING FLUID MATERIAL PREPACKAGED IN A CONTAINER

BACKGROUND OF THE INVENTION

1. Field of the Invention

In general, the present invention relates to dispensing pumps that are used to draw liquid material out of a container. More particularly, the present invention relates to dispensers that are used to draw material out of an inverted container.

2. Prior Art Description

Commercial products, such as shampoos, conditioners, skin moisturizers, honey, ketchup are a few examples of high-viscosity liquids that are packaged for retail sale. Such products are typically packaged for retail sale in either bottles or tubes.

The most common method of dispensing a high-viscosity liquid from a container is to provide the bottle or tube with a dispensing cap. A dispensing cap is a cap closure containing an orifice that can be selectively opened or closed. To dispense the high-viscosity material out of the container, the orifice in the cap is opened. The container is then squeezed to displace the high-viscosity material out of the container through the open orifice. If the container is nearly empty, the container is inverted so that the high-viscosity material slowly pools near the dispensing cap.

The problem associated with such dispensing systems is that the viscosity of the material may cause the material to flow very slowly. As such, the material may take a long time to flow to the dispensing cap when the container is inverted. Furthermore, the high viscosity of the material causes the material to cling to the walls of the container and resists movement toward the dispensing cap. As a result, some material always remains within the container that cannot be dispensed. This residual material is thrown away with the old container when a new full container is purchased.

Throwing away residual material in a container is of little concern when the material is inexpensive. However, there are many materials, such as skin care lotions, that can cost more than twenty dollars an ounce. With such high-priced materials, consumers expect to extract every drop of the material from its packaging container.

In the prior art, many highly viscous liquid products are packaged with pump dispensers to help draw material out of the confines of a container. For instance, most liquid soap dispensers contain small manual pumps to draw the soap up out of the container. In such prior art containers, the pump is located at the top of the container. A tube leads into the container and draws material from the bottom of the container. Such prior art dispensing systems are exemplified by U.S. Pat. No. 3,966,095 to Chappell, entitled Horizontally Operated Pump-Type Dispenser.

Pump dispensers that use drawtubes have a problem similar to that of squeeze containers. The drawtube of a pump dispenser draws material only from one small point in the container. Consequently, a large volume of residual material may be left within a container that cannot be received by the drawtube.

The one sure way to draw most all residual material out of a container is to eliminate the drawtube by inverting the container and pumping material from the lowest point under the container. In this manner, gravity will bias all residual material toward the dispensing pump. The obvious problem with such systems is that the container of material must be mounted atop the dispensing pump. This recreates a top-heavy and unstable assembly. Furthermore, since the pump is located at the bottom of the system, access to the pump is blocked by the presence of the inverted container. As a result, inverted container pump dispensers have been limited to wall mounted units, such as is exemplified by U.S. Pat. No. 6,601,736 to Ophardt, entitled Liquid Dispenser For Dispensing Foam. It will be understood that for everyday applications, wall mounted dispenser systems are impractical.

A need therefore exists for a dispensing system that can draw the free-flowing contents and residual material out of many different types of prepackaged containers without requiring that the dispensing system be wall mounted or the dispensing point being difficult to access. This need is met by the present invention as described and claimed below.

SUMMARY OF THE INVENTION

The present invention is a dispenser system for dispensing a highly viscous liquid from a container having a threaded neck. The system utilizes a free-standing base that is positioned under the container. The base defines a receptacle that receives the threaded neck of the container. In this manner, gravity biases the contents of the container into the base. The base contains a reservoir chamber that is supplied with the liquid from the container.

A pump is provided that draws some of the highly viscous liquid from the reservoir chamber and dispenses that liquid when manually operated. The pump is held atop a support. The support holds the pump at a predetermined height above the base. The height of the pump is greater than the length of the container. In this manner, the pump is unobstructed in a full 360 degree range around the pump. The pump can therefore be accessed from any angle without interference by the inverted container.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention dispensing system can be embodied in many ways, the embodiment illustrated shows the dispensing system being used to dispense material out of a bottle container. This embodiment is selected in order to set forth the best mode contemplated for the invention. The illustrated embodiment, however, is merely exemplary and should not be considered a limitation when interpreting the scope of the appended claims.

Figure 1:
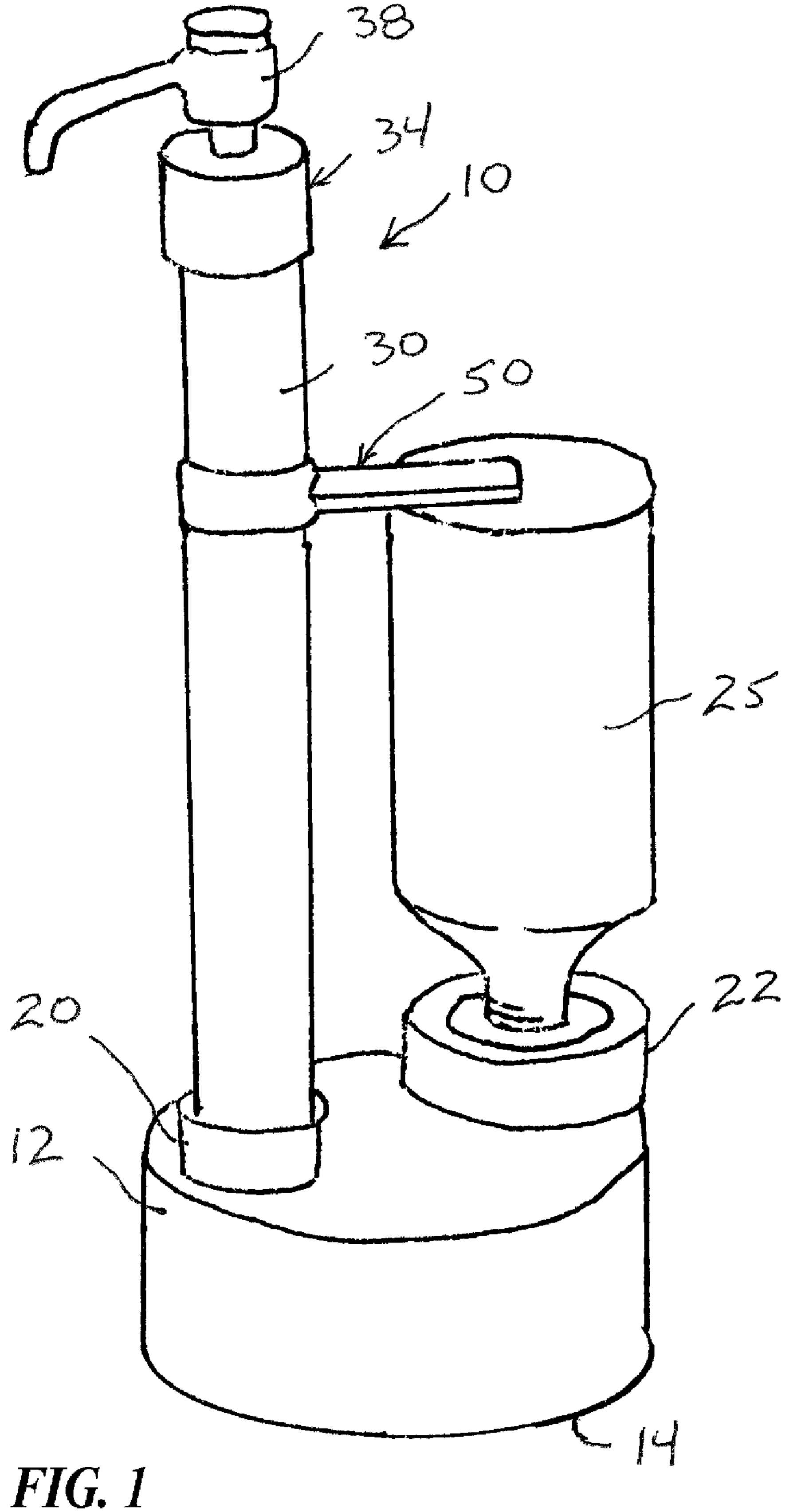
FIG. 1 is a perspective view of an exemplary embodiment of a dispensing system for highly viscous liquids.
Figure 2:
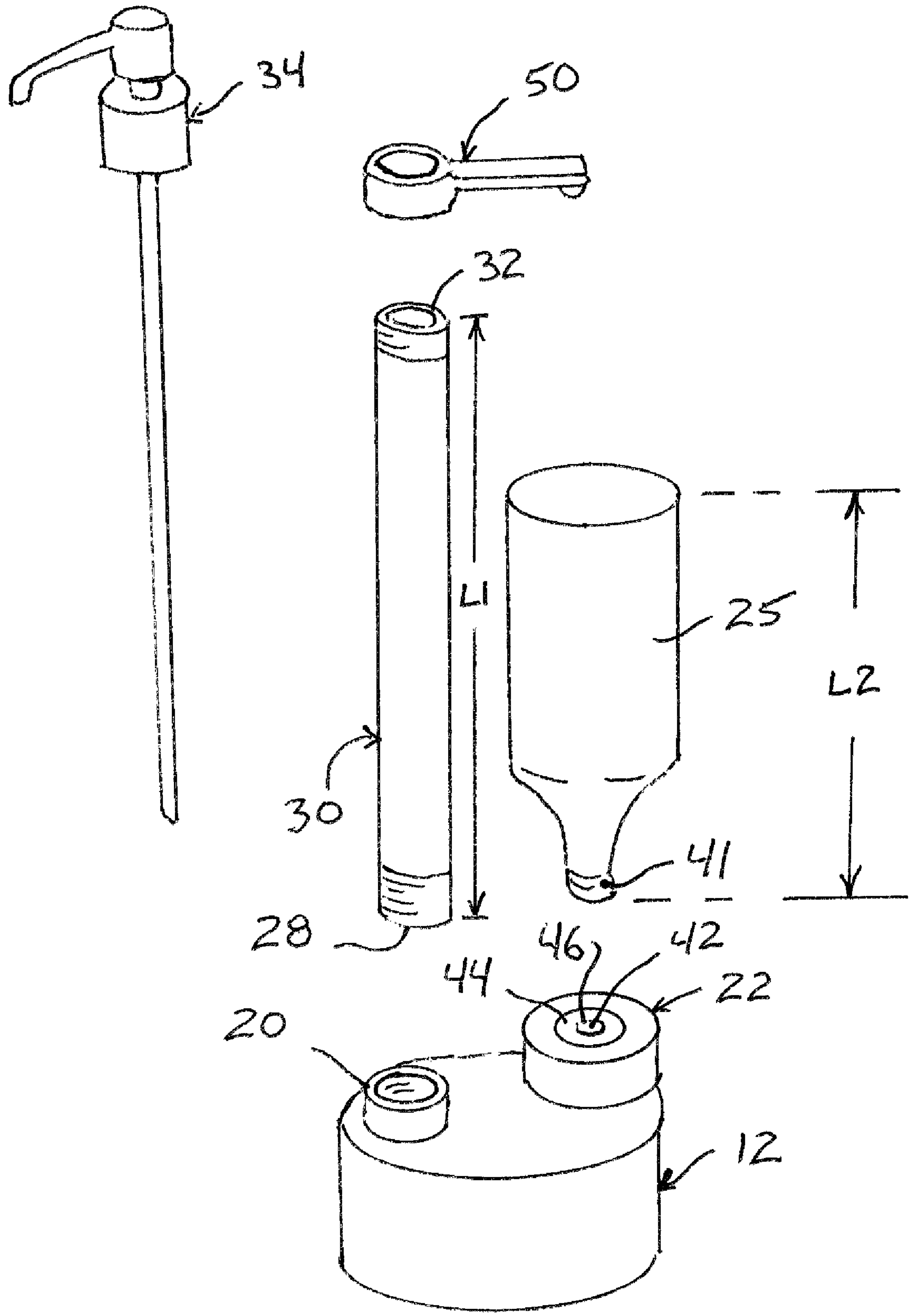
FIG. 2 is an exploded view of the embodiment of FIG. 1.
Figure 3:
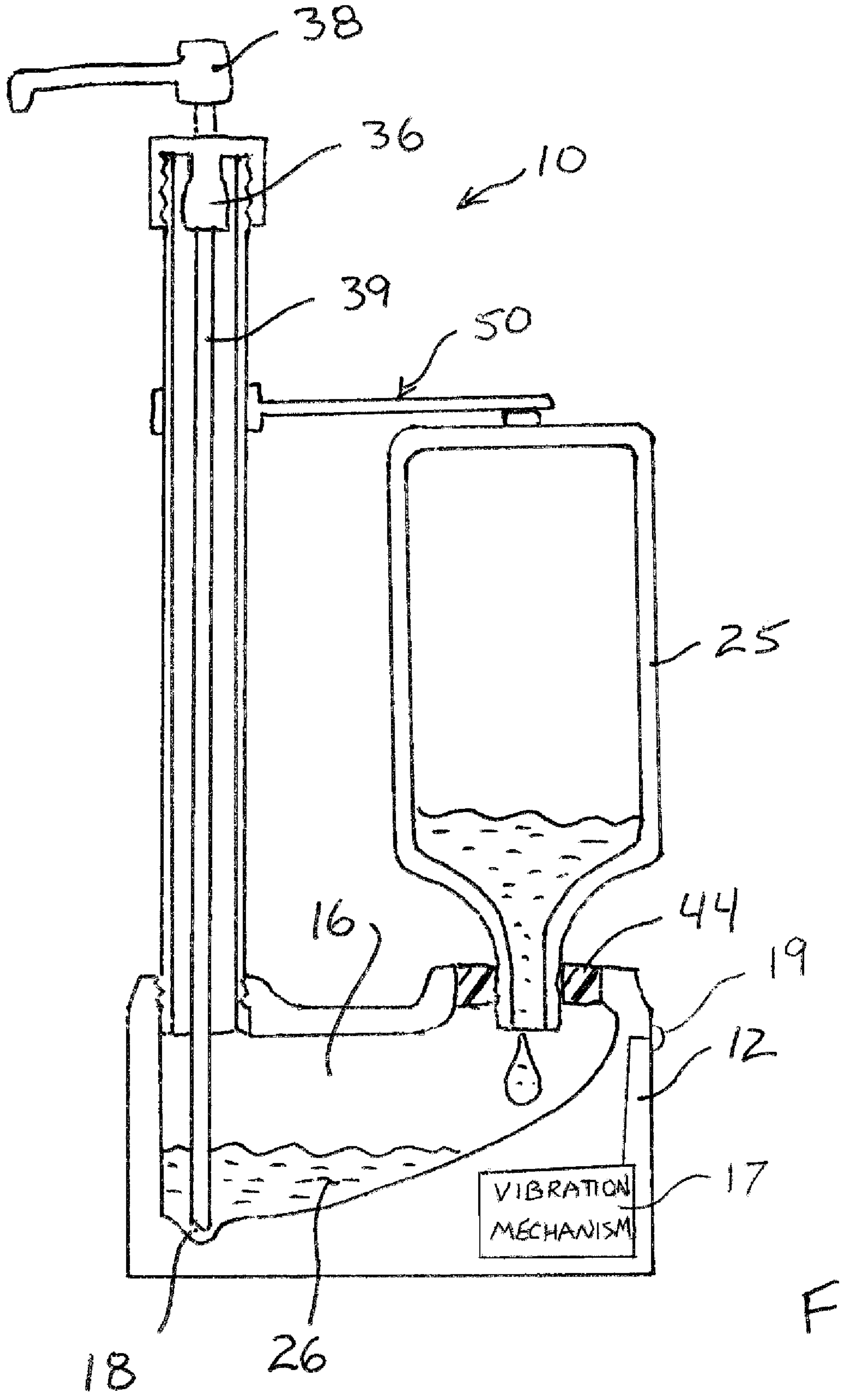
FIG. 3 is a cross-sectional view of the embodiment of FIG. 1.

Referring in combination to FIG. 1, FIG. 2 and FIG. 3, an exemplary embodiment of the dispensing system 10 is shown. The dispensing system 10 includes a base 12. The base 12 has a flat bottom 14 that enables the base 12 to rest steadily upon any flat surface. Inside the base 12 is a reservoir 16. The reservoir 16 is contoured to have a low point 18. In this manner, any liquid that is in the reservoir 16 will collect at the low point 18.

An optional vibrating mechanism 17 can be located within the base 12. The vibrating mechanism can be either battery powered or powered via a plug. The vibration mechanism 17 has an on/off switch 19 for activating the vibrating mechanism 17. When the vibrating mechanism is activated, the base vibrates, therein anything supported by the base 12 to also vibrate.

The reservoir 16 can be accessed through two access ports 20, 22. The first access port 20 leads to a pump assembly 24 that draws material from the reservoir 16. The second access port 22 receives a container 25 of liquid material 26 that fills the reservoir 16. Accordingly, liquid material 26 enters the reservoir 16 through the second access port 22 and exits through the first access port 20.

The first access port 20 is sized and shaped to receive the bottom end 28 of a tubular support 30. In the shown embodiment, the first access port 20 is female threaded while the bottom end 28 of the tubular support 30 is male threaded. A threaded interconnection is only one of many ways the tubular support 30 may connect to the base 12. In alternate embodiments, the tubular support 30 may be adhered to the first access port 20 or it may engage the first access port 20 with a friction fit.

It is preferred that the tubular support 30 be selectively detachable from the base 12. In this manner, tubular supports of different lengths can be affixed to the base 12 for different container sized applications, as will later be explained in more detail.

The tubular support 30 is a hollow tube having a length L1 that extends between a top end 32 and the bottom end 28. As mentioned, the bottom end 28 of the tubular support 30 is attached to the first access port 20 on the base 12. The top end 32 of the tubular support 30 receives a manual pump assembly 34.

The manual pump assembly 34 includes a pump mechanism 36, a dispensing head 38 and a segment of supply tubing 39. The pump mechanism 36 is operated by pressing downwardly upon the dispensing head 38. As the dispensing head 38 is pressed downwardly, the pump mechanism 36 pumps material 26 out of the dispensing head 38. The dispensing head 38 is spring biased into an extended position. When not pressed, the dispensing head 38 returns to its extended position and the pump mechanism 36 draws material up the supply tubing 39.

In the prior art, there are many manual pump assemblies that are used to draw liquid material up a segment of supply tubing. Many such prior art pump assemblies can be adapted for use by the present invention. It should also be understood that the pump mechanism need not be at the top of the tubular support 30 but can be located within the tubular support 30.

In the shown embodiment, the pump assembly 34 connects to the top end 32 of the tubular support 30 using a threaded connection. This interconnection is exemplary and it should be understood that any connecting configuration can be used to hold the pump assembly 34 in place atop or within the tubular support 30.

The pump assembly 34 draws material through a section of supply tubing 39. The section of supply tubing 39 is long enough to extend down the tubular support 30, through the first access port 20, and into the base reservoir 16. It will therefore be understood that when a person manually operates the pump assembly 24, although the pump assembly 24 is located atop or within the tubular support 30, the pump assembly 24 is drawing material from the reservoir 16 in the base 12.

The second access port 22 is sized and shaped to engage the threaded neck 41 of a retail container 25. Most bottle containers and tube containers have threaded necks. The threaded neck 41 can be exposed by unscrewing the dispensing cap (not shown) that normally accompanies such containers. The second access port 22 can itself be threaded and sized to receive a threaded neck 41 with a threaded connection. However, commercial products come in a variety of different containers having various threaded necks with differing thread sizes. It is, therefore, preferred that the second access port 22 be terminated with a receptacle 42 capable of receiving a wide variety of threaded necks. The receptacle 42 preferably includes an elastomeric grommet 44 with a small central opening 46. The threaded neck 41 of a container 25 is pressed through the central opening 46, therein stretching the opening 46 to the correct size. This produces a seal between the second access port 22 and the container 25 that is impervious to the contents of the container 25.

If a threaded interconnection is not used between the container 25 and the second access port 22, the container 25 may have to be stabilized. This is especially true if the container 25 is large. The container 25 has a length L2. The tubular support 30 has a length L1 that is longer than the length L2 of the container 25. In this manner, the tubular support 30 will support the pump assembly 34 at a position that is higher than the container 25.

A support arm 50 is provided that can be selectively moved up and down the length of the tubular support 30. The support arm 50 can be locked into position at any point along the tubular support 30. The support arm 50 is brought into contact with the container 25 and is locked into position. This stabilizes the container 25 and prevents the container 25 from moving. In this manner, the container 25 will not accidentally move and disengage from the second access port 22 should the container 25 be inadvertently contacted.

Since the tubular support 30 is longer than the container 25, the tubular support 30 holds the pump assembly 34 above the container 25. As a result, the pump assembly 34 is easily accessed and is in no manner obstructed by the container 25.

It has been previously stated that the tubular support 30 is preferably detachable from the base 12. This enables a manufacturer to equip the dispensing system 10 with tubular supports of different heights. In this manner, if the dispensing system 10 is marketed for use with a specific container of material, the tubular support 30 can made to be just higher than the selected container. Alternatively, the dispensing system 10 may be marketed with a plurality of tubular supports. A consumer can then use the proper sized tubular support depending upon the size of the container from which material is being dispensed.

To utilize the dispensing system 10, a container 25 is inserted into the base 12 at in an inverted orientation. The container 25 is locked into the base 12 using the support arm 50. The material in the container 25 flows into the reservoir 16. As needed the material is dispensed from the reservoir using the pump assembly 34. As the container 25 empties, the vibration mechanism 19 can be activated. This shakes the container and causes most all remaining material to flow to the bottom of the reservoir 16 for removal.

It will be understood that the embodiment of the present invention that is illustrated and described are merely exemplary and that a person skilled in the art can make many variations to that embodiment. For instance, the tubular support need not by cylindrical in shape. Rather, it can be stylistic and embody any ornamental shape. Likewise, the base can also be varied into many ornamental shapes. All such embodiments are intended to be included within the scope of the present invention as defined by the claims.

What is claimed is:

1. A liquid dispenser, comprising:

a container for holding liquid, said container extending a length between a closed end and an open end, wherein said open end is adjacent a threaded neck;

a free-standing base having a receptacle that receives said threaded neck of said container, said base defining a reservoir chamber accessible through said receptacle wherein said reservoir chamber is supplied with said liquid from said container;

a pump that draws some of said liquid from said reservoir chamber and dispenses said liquid when manually operated;

a support for holding said pump at a predetermined height above said base, wherein said predetermined height is greater than said length of said container; and a clamping element that extends from said support for engaging and stabilizing said container, wherein said clamping element is selectively adjustable in position along said support.

2. The dispenser according to claim 1, wherein said pump includes a supply tube that extends through said support and into said reservoir chamber of said base.

3. The dispenser according to claim 1, wherein said clamping element engages said closed end of said container.

4. The dispenser according to claim 1, wherein said support is selectively detachable from said base.

5. The dispenser according to claim 1, further including a vibration mechanism within said base for selectively causing said base to vibrate.

6. A dispenser for dispensing the contents of a container, wherein said container has a predetermined height, said dispenser comprising:

a base that defines a reservoir chamber;

a vibration mechanism within said base for selectively causing said base to vibrate;

a receptacle on said base that leads to said reservoir chamber, wherein said receptacle is configured to receive and retain a portion of said container;

a pump that draws from said reservoir chamber and dispenses when manually operated; and a support for holding said pump at an elevated height above said base, wherein said elevated height is greater than said predetermined height of said container.

7. The dispenser according to claim 6, wherein said pump includes a supply tube that extends through said support and into said reservoir chamber of said base.

8. The dispenser according to claim 6, wherein said support is selectively detachable from said base.

9. The dispenser according to claim 6, wherein said pump is selectively detachable from said support.

10. A method of dispensing fluid material from a container of the type having a threaded neck, said method comprising the steps of:

providing a base that defines a reservoir chamber, wherein said base receives said threaded neck of said container, holding said container in an inverted position so that said fluid material from said container fills said reservoir chamber;

selectively vibrating said base;

providing a pump for drawing and dispensing said fluid material out of said reservoir chamber; and providing a support for holding said pump at an elevated height above said base, wherein said pump is held at an elevation higher than said container.

* * * * *